June 9, 1959  L. E. YETTER  2,889,765
ELECTRIC COOKING APPLIANCE
Filed Aug. 7, 1958  2 Sheets-Sheet 1

Inventor:
Lloyd E. Yetter
By (signature)
Atty.

June 9, 1959
L. E. YETTER
2,889,765
ELECTRIC COOKING APPLIANCE
Filed Aug. 7, 1958
2 Sheets-Sheet 2
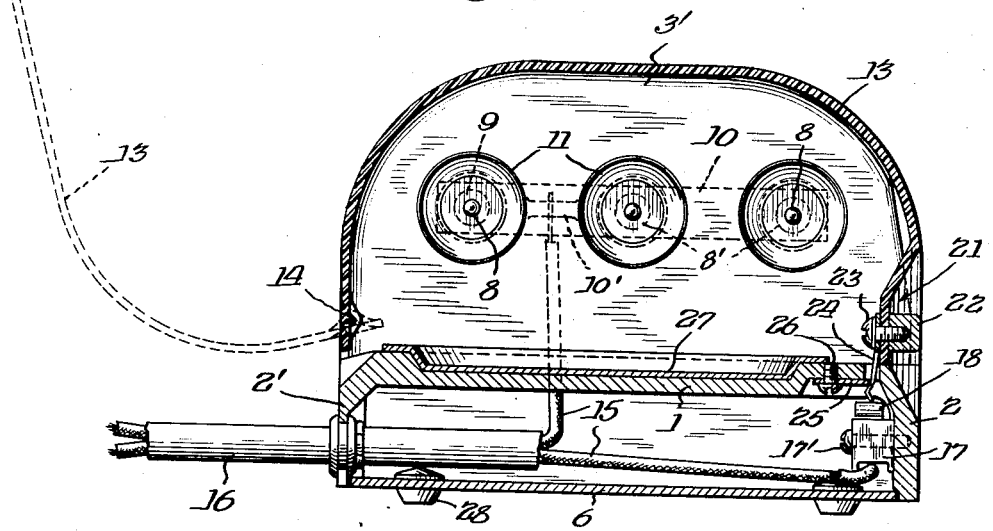
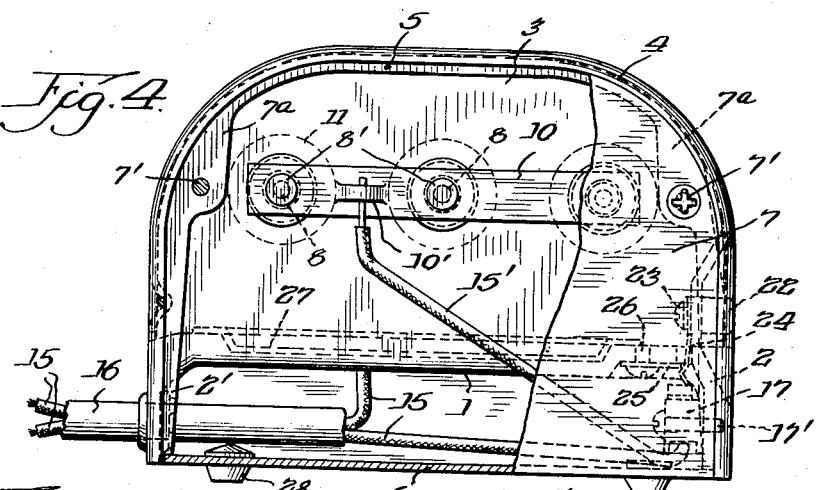
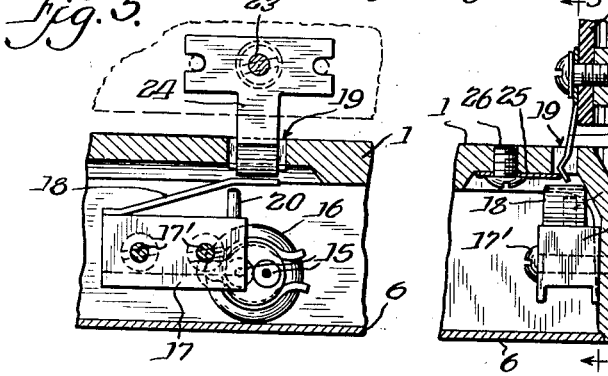
Inventor.
Lloyd E. Yetter.

United States Patent Office 2,889,765
Patented June 9, 1959

2,889,765

ELECTRIC COOKING APPLIANCE

Lloyd E. Yetter, Colchester, Ill.

Application August 7, 1958, Serial No. 753,808

3 Claims. (Cl. 99—337)

This invention relates to improvements in culinary appliances, more particularly, to an electric cooking device.

It is an object of the invention to provide an appliance of the above stated character for cooking edibles, such for example, as frankfurters, and similar moisture containing meats or other products (preformed, preshaped or otherwise) by conducting to and inducing thereinto an electric current which in traversing or rendering the edible electropositive will be resisted by its moisture content to an extent that an internal heat will be generated and directly exchanged therein, the degree of the generated heat being sufficiently high to effect the cooking of said edible and at the same time, retain the juices and savor therewithin.

Another object of the invention is to provide a cooking device wherein a direct and internal application of heat energy will be effected to the matter to be and being cooked and in so doing, will cause an economical and rapid cooking of the same.

Another and equally important object of the invention is to provide a portable electric cooking appliance which is capable of convenient and safe usage and which will become operative only when closed; conversely, when opened will become inoperative, and wherein the matter or product when and while being cooked will be wholly enclosed hence, will be protected and also will be prevented from splattering with the incident mess thereof.

A still further object of the invention resides in the provision of an electric cooking appliance of durable, simple and dependable construction capable of economical and rapid assembly and wherein the utilized electric conductors and electric circuit closing means will be shielded from the deposit of splattered matters thereon during operation of the appliance, thereby ensuring prolonged satisfactory usage.

It is also an object of my invention to provide an electric cooker having a main or super-structure body whose construction and form is such as will furnish strong and sturdy end walls and a bottom for the device on and to which certain component parts thereof will be received, supported and conveniently and operatively retained, while other component parts will be effectively housed thereby and shielded from undesirable extraneous contact.

Other objects of the invention will be in part obvious and in part pointed out hereinafter.

The foregoing, as well as other objects, advantages and meritorious teachings of my invention will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

In the drawings:

Figure 3 is a vertical transverse section taken on the line 3—3 of Figure 1, looking in the direction in which the arrows point, with a portion of the cooker device cover shown in dotted lines in its open position.

Figure 4 is a section similar to section 3 taken through one end portion of the cooker with a portion of the end wall shown in elevation.

Figure 5 is an enlarged fragmentary detail in section taken on the line 5—5 of Figure 6, looking in the directions in which the arrows point, and Figure 6 is a like view but taken at substantially right angles to Figure 5.

Referring in detail to the drawings, the invention comprises a body cast, molded or otherwise formed to provide a horizontal bottom 1 having a dished upper face, front and rear side legs 2 and 2', and relatively upstanding end walls 3 and 3', the upper portions of which are correspondingly curved. The side and upper perimeter portions of the end walls are formed with outwardly disposed horizontal flanges or lips 4 each inwardly shouldered, as at 5 and 5', for a purpose presently described.

Figure 1:
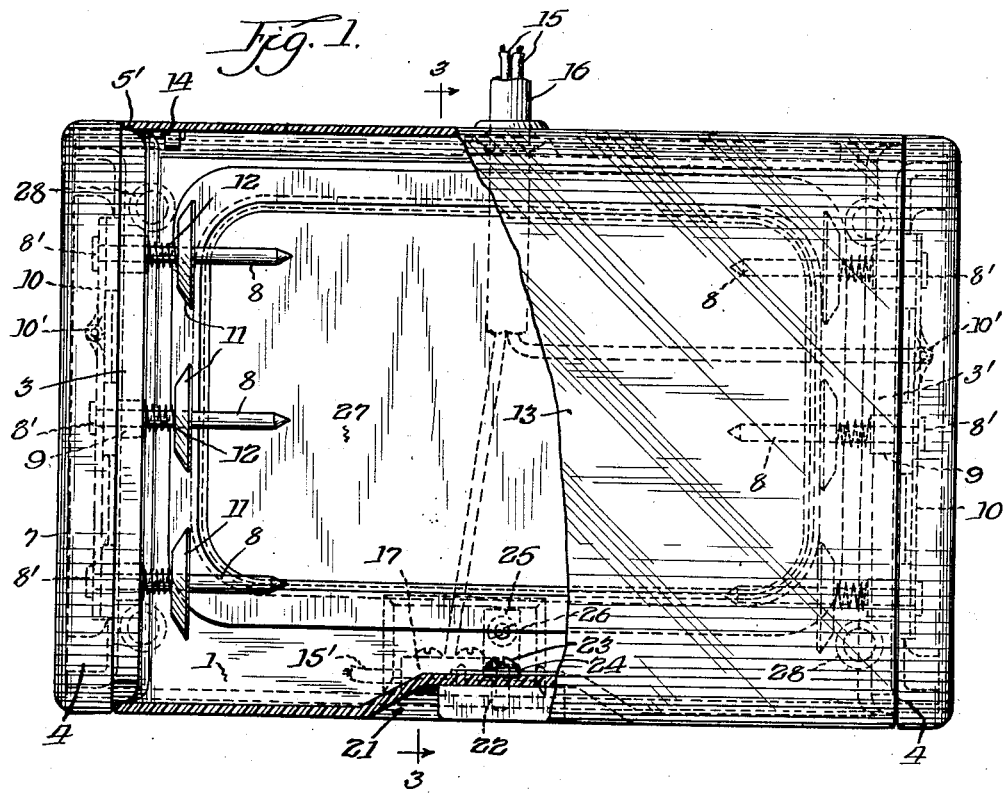
Figure 1 is a top view of the improved electric cooker with one portion thereof broken away and shown in horizontal section.
Figure 2:
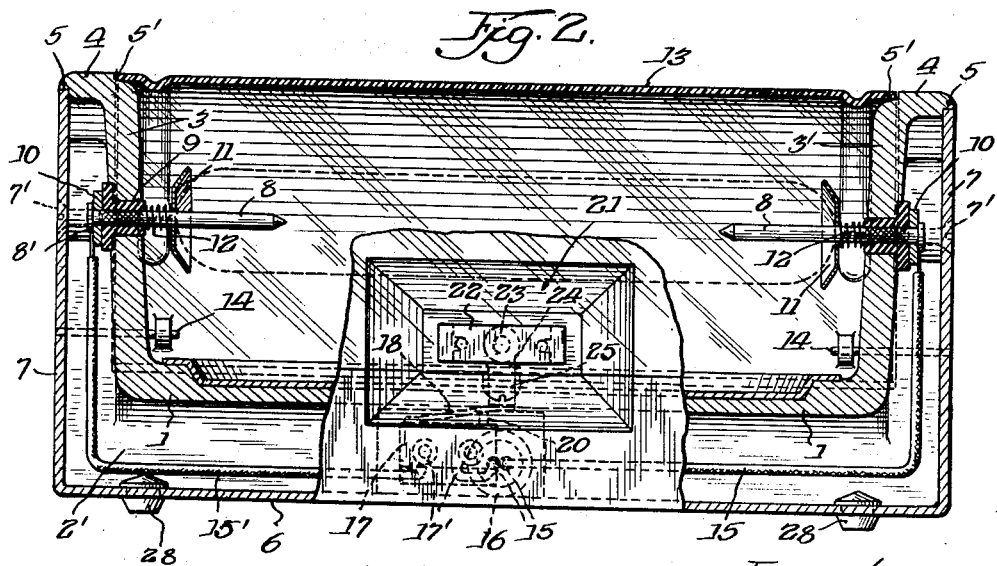
Figure 2 is a vertical longitudinal section through the same with a portion of the cover and front wall shown in elevation whereby to illustrate the cover catch and the micro-switch for making and/or breaking electrical circuit to and between the edible matter engaging electrodes of the device.

A casing or housing made of suitable sheet material consisting of a bottom 6 and upstanding end walls 7 substantially corresponding in shape to the body end walls 3—3' nestingly receives said body therein with the marginal portions of its end walls flushly seated on the shoulders 5 of the body end walls, as shown in Figures 1 and 2 of the drawings. Screws 7' or other suitable fastening devices are engaged through and with the housing end walls and in screw-threaded openings in enlarged portions 7ª of the shouldered portions 5 of the flanges 4 of the end walls 3—3' and effect securing connection between said housing and the cast or molded body.

Edible article impaling electrodes each preferably in the form of a pin or sharpened rod made of non-corrodible metal, carbon or other suitable material, generally designated by the numeral 8, are received on and fixedly supported by the body end walls 3—3' above its horizontal bottom. Said electrodes are equi-spaced and horizontally positioned so that their respective inner extended portions are parallel to the body bottom. These electrodes, as will be seen upon reference to Figure 1 of the drawings, are arranged in paired and opposed longitudinal relation. To electrically insulate said electrodes from the body end walls 3—3' fiber or like bushings 9 are engaged in and through the same above the bottom 1. The electrodes are snugly or fixedly received in and through the bushings in the manner shown. Their outer ends are contactingly engaged, as at 10', with buss-bars 10 adjacent and disposed transversely of the outer sides of the body end walls and in insulated engagement with the adjacent ends of the bushings. Heads 8' are formed or otherwise provided on the outer ends of each of the electrodes and are in secure electrical engagement with their respective or adjacent buss-bars. The lengths of the inner extended portions of the electrodes are such that they may have firm engagement with edibles impaled thereon. If desired, cup-like grease or liquid splatter guides 11 may be received by and movably supported on each of the electrodes within the body, engaged by coiled springs 12 also on said electrodes, for an obvious purpose.

A cover 13 of cross-sectional shape and size corresponding to those portions of the body end walls 3—3' above its bottom, and length slightly greater than the space therebetween, is hinged, at 14, to the rearward portions thereof. Being so mounted, it is swingable with relation to the body to close or cover the same and when desired, to open it, as indicated in dotted lines in Figure 3 of the drawings. When closed, the cover end portions seat on the shoulders 5' of the end wall flanges 4 flush with their outer sides.

Electrical conductors 15, of appropriate lengths, are passed into the device via an insulating protective sleeve 16 mounted in the body rear side leg or wall 2'. They are extended and electrically connected to one of the buss-bars 10 and to one contact terminal of an electric switch 17 (hereinafter described) fixedly mounted on the inner side of the body front side wall or leg 2 by screws 17', or other suitable means. Another electrical conductor 15' is within the lower portion of said device below the bottom 1 and has its opposite ends electrically connected to the remaining terminal of said micro-switch and the remaining buss-bar 10.

It will be understood that the free or outer ends of the conductors 15 are provided with a conventional type of electrical fitting (not shown) for connection with a suitable source of electric power.

In order that electrical energy will be supplied to the longitudinally paired impaling electrodes 8 as and when the cover 13 is swung to its closed or covering position (see Figures 3 and 4), the switch 17, noted above, is provided as shown in Figures 3-6. Its movable switch blade 18 is positioned directly below and in communication with an opening 19 formed in the body bottom 1, while the fixed contact point or terminal 20 thereof is positioned directly below and in cooperative relationship to the free or outer portion of said blade. Thus, when the blade 18 is thrust downwardly into contact with the switch terminal 20, an electrical circuit will be closed via the conductors 15 and 15' through the buss-bars 10 and electrodes 8.

An intermediate portion of the forward or normally front side of the cover 13 is depressed or compartmented, as at 21, and has a finger engaging piece or knob 22 fixedly mounted therein by the screw 23. A spring metal catch 24 is also engaged with and fixedly mounted by the screw 23 adjacent the inner side of the depressed portion 21 of the cover 13. The length of said catch is such that when said cover 13 is swung to its fully closed position, the lower end thereof will thrustingly engage the free end of the switch blade 18 and move it downwardly into electrical contact with the switch terminal 20 whereby to close the aforesaid electrical circuit.

To removably retain the cover 13 in its closed position and in its aforesaid electrical circuit closing engagement with the described switch components, a catch plate 25 is mounted upon the under side of the body bottom 1 by a screw 26 or other suitable means. Its outer end is extended partially over the opening 19 in the body bottom 1. Hence, when the catch portion of the catch 24 springingly engages thereover, full or complete closure of the cover 13 will be assured and moreover, retention of the switch blade 18 in contact with the switch terminal 20 will be maintained. Of course, when it is desired to swing the cover 13 to its open position, one need only engage the knob 22 to facilitate upward and outward swinging movement thereto. At this time, complete and convenient access will be afforded to the interior of the device and to the electrodes 8. Concurrently with such opening of the cover, it will also be seen and understood that the catch 24 will be disengaged from the catch plate 25 and the switch blade 18 of the switch 17 will be allowed to move upwardly into circuit breaking relationship to the micro-switch terminal 20, thereby deenergizing the electrodes 8.

It is preferable that a pan 27, of shape and size corresponding to the dished upper face of the body bottom 1, shall be provided to the device and shall, of course, be removably received within such dished portion—this to provide for the catching and retention of liquids or grease matters exuded from edibles impaled on the electrodes 8 during their cooking. Also, if desired, the bottom 6 of the housing may be provided with suitable feet 28, for an obvious purpose.

In usage of my electrical cooking appliance, and assuming that the same is to be utilized for the cooking or roasting of frankfurters, the cover 13 is swung to its relative open position. At this time, a frankfurter is end wise positioned adjacent or between the longitudinally paired electrodes and has its end portions impaled thereon. One or more frankfurters may, obviously, be so positioned and supported between said longitudinally paired electrodes. Assuming that the electrical conductors 15 have been connected to a suitable source of electrical energy, when the cover 13 is swung to its hereinbefore described closed position, the frankfurter or frankfurters will be housed or shielded thereby and the switch 17 will be closed due to the depressing engagement of the catch 24 with its switch blade 18. Thus, the electrodes 8 will be energized. Due to the moisture content of the frankfurters, electrical conductivity will be accorded thereto. Such conductivity being poor or of resistive character will, obviously, resist the passage of electrical current through the frankfurter and in so doing, an internal heat will be generated therewithin, the degree of which will be quite sufficient to effect their cooking.

As and when a cooking usage of my improved device is completed, the frankfurter may be removed by, first swinging the cover 13 to its open position and then engaging and removing the frankfurters from their respective impaling electrodes 8.

While I have hereinbefore described the usage of the invention for the cooking or roasting of frankfurters, it will be readily understood and appreciated that it may be used with equal efficiency and/or satisfaction for the cooking of various kinds of pre-formed moisture containing edibles, i.e., the device is in no manner limited for usage in the cooking or roasting of any one particular kind or type of moisture containing edible.

I claim:

1. An electric cooking appliance, comprising a one piece body consisting of a horizontal tray having front and rear side legs disposed downwardly therefrom and relatively opposed and upstanding end walls extending above the tray side legs upper portions of which are outwardly flanged and shouldered, a housing consisting of a bottom and upstanding end walls receiving said body therein, the end walls of said housing being adjacent and connected to the end walls of the body and flushly seated in the shouldered portions of the flanges thereof, article impaling electrodes carried on each of the body walls in paired longitudinally and inwardly disposed and opposed spaced relation above said tray, a cover hinged at one side to one side of the body swingable over and into engagement with the marginal portions of said body end walls and over its tray, electrical conductors on the body end walls connected to said impaling electrodes, and electrical circuit closing means on the body connected to said conductors and activated by said cover when the same is swung to closed position over the body end walls and tray and deactivated when said cover is swung away from said body end walls and tray to open position.

2. An electric cooking appliance, comprising a one piece body consisting of a bottom having a dished upper face and front and rear side legs disposed downwardly therefrom and relatively opposed upstanding end walls extending above said bottom and side legs upper portions of which are outwardly flanged, a housing consisting of a bottom and upstanding end walls nestingly receiving said one piece body therein, the end walls of said housing covering the end walls of said body and seated on the flanges thereof, article impaling electrodes carried on each of the body end walls in paired longitudinally and inwardly disposed and opposed spaced relation above the body bottom, a tray removably received in the dished upper face of the body bottom, buss-bars adjacent the outer faces of the body end walls electrically connected to said impaling electrodes, a cover hinged at one side to one side of the body swingable over and into engagement with the marginal portions of said body end walls and over the bottom thereof, electrical conductors connected to said buss-bars, and electrical circuit closing means on the body beneath the bottom thereof connected to said conductors adapted to be activated by said cover when the same is swung to a closed position over the body end walls and body bottom and deactivated when said cover is swung away from said body end walls and body bottom to open position.

3. An electric cooking appliance, comprising a body consisting of a bottom, supporting legs therefor and relatively upstanding end walls extending above the bottom the marginal portions of which are outwardly flanged, a housing consisting of a bottom and upstanding end walls nestingly receiving said body therein, the end walls of said housing covering the body end walls and engaging the flanges thereon, a cover hinged at one side to the body swingable over and into engagement with said body walls, article impaling electrodes carried on each of the body end walls in paired longitudinally and inwardly disposed and opposed spaced relation above the body bottom, electrical conductors on the body end walls connected to said electrodes, and electrical circuit closing means on the body connected to said conductors activated and deactivated with swinging of the cover, respectively, over and from the body end walls.

References Cited in the file of this patent

UNITED STATES PATENTS

| | | |
|---|---|---|
| 1,993,353 | Young | Mar. 5, 1935 |
| 2,052,919 | Brogdon | Sept. 1, 1936 |
| 2,274,325 | Ford | Feb. 24, 1942 |